United States Patent [19]

Schmidt, Jr.

[11] 4,247,394
[45] Jan. 27, 1981

[54] FILTER ELEMENT AND METHOD OF USE
[75] Inventor: Henry Schmidt, Jr., Hinsdale, Ill.
[73] Assignee: Industrial Filter & Pump Mfg. Co., Cicero, Ill.
[21] Appl. No.: 63,116
[22] Filed: Aug. 2, 1979
[51] Int. Cl.³ .................. B01D 46/02; B01D 29/14
[52] U.S. Cl. ................... 210/767; 55/341 NT; 55/380; 210/232; 210/342; 210/484; 210/323.2
[58] Field of Search ............ 55/334, 341 NT, 377, 55/380; 210/65, 232, 237-238, 315, 323 T, 337, 342, 484

[56] References Cited
U.S. PATENT DOCUMENTS

| 1,813,896 | 7/1931 | Paine | 55/341 NT |
| 2,800,194 | 7/1957 | Peek | 55/380 |
| 3,526,323 | 9/1970 | Smith | 210/484 X |
| 4,081,379 | 3/1978 | Smith | 210/342 X |

FOREIGN PATENT DOCUMENTS 6987 of 1889 United Kingdom .................. 210/323.2

Primary Examiner—Charles N. Hart
Assistant Examiner—Richard W. Burks
Attorney, Agent, or Firm—Edmond T. Patnaude

[57] ABSTRACT

A filter element utilizes a perforate inner filter tube sock tightly fitted within an outer perforate support tube sock, the two socks being sealably mounted at their open ends to a tube sheet with the support tube held in tension by the pressure differential across the filter tube during operation of the associated filter.

11 Claims, 6 Drawing Figures

FILTER ELEMENT AND METHOD OF USE

The present invention relates in general to the art of pressure filtration wherein a liquid to be clarified is passed through a tubular filter element, and it relates in particular to a novel filter element and method of use wherein the principal support member is a non-rigid, flexible, porous, textile sock fitted over a tubular filter sock and sealably mounted to an associated tube sheet so as to become stiff and rigid as fluid is supplied under pressure into the inner filter sock.

BACKGROUND OF THE INVENTION

Filters employing tubular filter elements into and through which the liquid is to be filtered is pumped have been successfully used for many years. Such filter elements have employed rigid perforate support tubes enclosing a finely perforated inner sleeve in which the solids entrained in the filtrate are collected. Such external support tubes have generally been formed of metal. However, because many liquids to be filtered react with most metals, for many applications the support tubes cannot economically be formed of metal. Attempts to replace the conventional metal support tubes with plastic tubes have not been successful because presently available plastics do not have the required strength to withstand the forces exerted on such tubes during normal operation of the associated filters. Consequently, other types of filters which are inherently less efficient for particular applications have nevertheless been used where the cost and size of the support tubes is prohibitive.

In the past it has been both difficult and time consuming to clean those types of filter tubes in which the solids are internally collected, and the problem is more acute where the collected solids are toxic in nature.

SUMMARY OF THE INVENTION

Briefly, there is provided in accordance with one aspect of the present invention a tubular filter element having an inner flexible filter member in the form of a tubular sock tightly fitted within a flexible elongated woven support sock which is formed of a woven textile material and which becomes stiff and rigid only when the associated filter is functioning and liquid flows under pressure into the inner filter member.

The outer support sock may thus be made of a synthetic plastic material which is inert relative to the liquids to be filtered while being sufficiently strong to withstand the high pressures encountered in normal filter systems. Also, since the openings in the support sock are very small, the inner sock is not pressed into the openings in the support sock whereby the inner sock and the filtered solids collected therein may be removed from the support sock and discarded as a unit.

GENERAL DESCRIPTION OF THE DRAWINGS

The present invention will be better understood by a reading of the following detailed description taken in connection with the accompanying drawings wherein.

DETAILED DESCRIPTION OF THE INVENTION

Figures 1, 2:
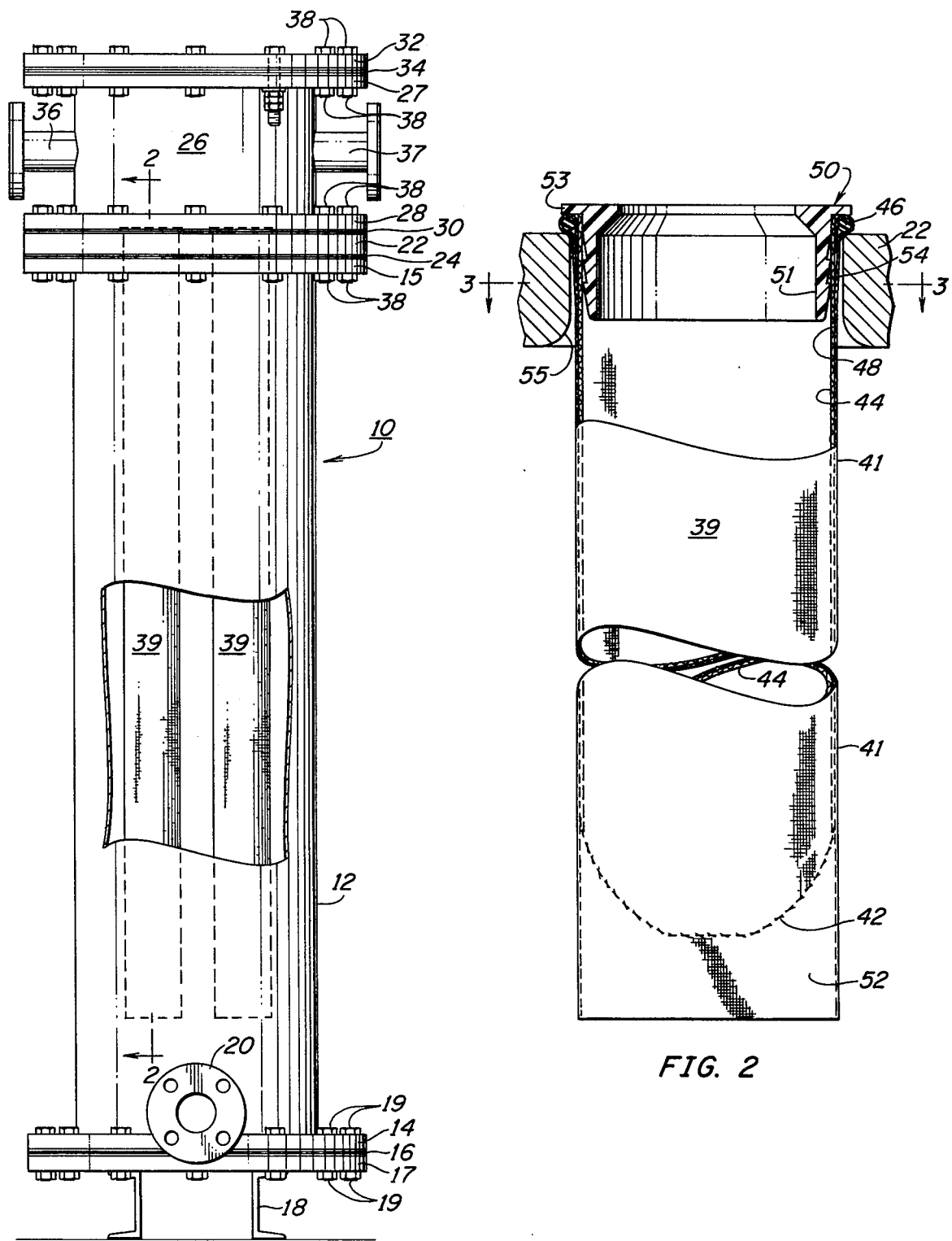
FIG. 1 is an elevational view of a pressure filter embodying the present invention, a portion of the filter tank being broken way to show a plurality of internally mounted filter tubes.
FIG. 2 is a fragmentary sectional view taken along the line 2—2 in FIG. 1 and showing the manner in which the filter tubes are sealably mounted to the tube sheet.

Referring particularly to FIG. 1 of the drawings, a pressure filter 10 having a generally tubular overall construction includes a tubular body member or tank 12 having a pair of annular mounting flanges 14 and 15 at the respective ends thereof. A flat, imperforate circular plate 17 is sealably connect to the bottom mounting flange 14 by a gasket 16 and a plurality of nut and bolt assemblies 19, and a tubular support stand 18 is suitably secured as by welding to the bottom side of the plate 17. A liquid outlet duct 20 opens onto the bottom of the chamber within the body member 12 just above the mounting flange 14.

A circular tube sheet 22 is sealed to the upper flange 15 by an annular gasket 24. A chamber extender tube 26 having respective mounting flanges 27 and 28 at the top and bottom ends thereof is mounted over the top of the tube sheet 22 and is sealed thereto by an annular gasket 30. A flat, circular, imperforate cover plate 32 is sealed to the flange 27 by a gasket 34, and a plurality of liquid inlet ducts 36, 37 open onto the chamber within the extender 26. A plurality of nut and bolt assemblies 38 secure the extender 26 to the flange 15 and the cover plate 32 to the flange 27.

The liquid to be filtered is pumped through one or both of the inlets 36, 37 into the chamber above the tube sheet and down into a plurality of perforate, tubular filter elements 39 which hang from the tube sheet 22 into the chamber in the body member 12. As the liquid passes through the filter elements 39, solid particles entrained in the liquid bridge across the interstices in the filter media and are thus captured within the tube. The clarified liquid thus flows into the chamber in the tube 12 and exits the filter through the outlet 20.

Figure 3:
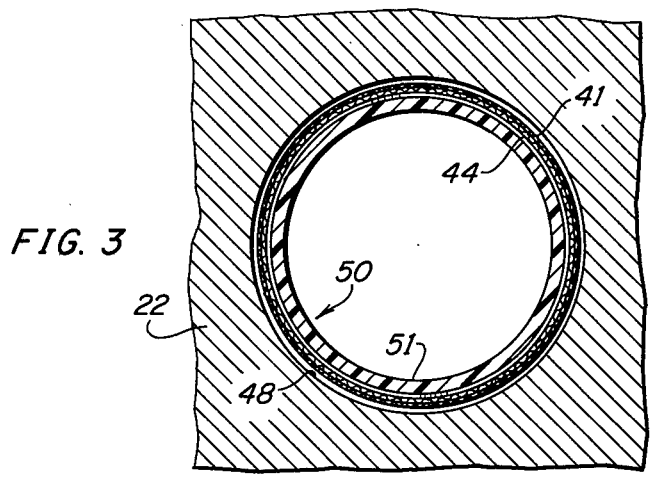
FIG. 3 is a fragmentary sectional view taken along the line 3—3 in FIG. 2.
Figure 4:
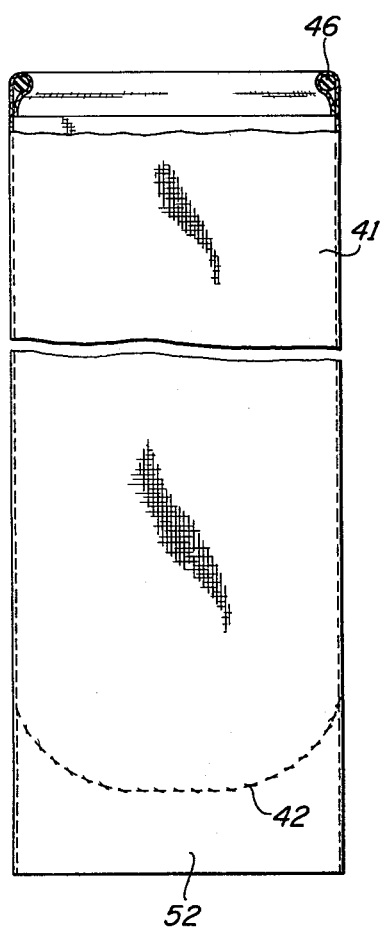
FIG. 4 is a view, partly in cross-section of a novel support sock embodying a feature of the invention.

With particular reference to FIGS. 2 and 3, it may be seen that each filter element 39 includes a perforate, generally tubular support member or sock 41 which is closed at the bottom by an elongated stitch. When the sock is lying flat, it is closed at the bottom along a generally arcuate line 42. A tubular replaceable filter sock 44 is tightly fitted within the support sock 41. The sock 44 is also sealably closed at the bottom with the closed end being tucked back up into the bottom end thereof. The open upper end of the outer support sock 41 is folded and stitched back down over a ring 46 which, as shown best in FIG. 4, is sewn to the body of the sock to fasten the ring 46 in place at the upper end of the support sock 41. The ring 46 has an outer diameter greater than the diameter of a circular hole 48 in the tube sheet 22 and is located above the hole 48. A tubular retainer 50 has a generally tubular body portion 51 which extends at least partially into the tube sheet and it also has an external annular flange 53 at the top which overlies the ring 46. It may be seen that the upper tubular end portion of the replaceable filter sock 44 is tightly fitted against the outer surface 54 of the retainer body portion 51. While the surface 54 may be serrated, as shown in FIG. 2, it need not be so configured inasmuch as a smooth surface has been found to function satisfactorily. The lower edge 55 of each of the holes 48 is chamfered or provided with a relatively large smooth radius to prevent undue wear on the fabric filter elements as they expand during operation of the filter.

As is explained more fully hereinafter, the filter sock 44 is substantially longer than the operative length of the support sock 41 so that when the filter element 39 is internally pressurized by the liquid being pumped therethrough, no axial force is exerted on the filter member 44 to pull it down away from the retainer 50. Moreover, the downward axial force on the support member 41 places it under tension to cause it to pull downwardly on the ring 46 and effect a good liquid tight seal between the filter element and the tube sheet 22. In like manner the retainer 50 is hydraulically forced downwardly toward the tube sheet to effect a good liquid tight seal between the flange 53 and the portion of the support sock 41 overlying the ring 46.

Figure 5:
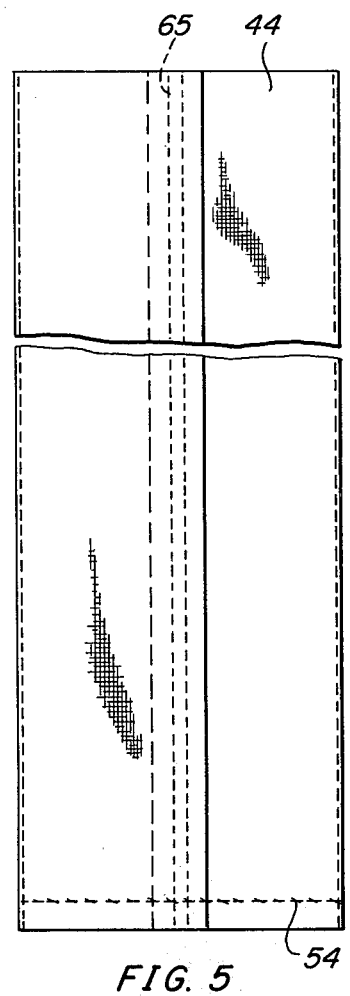
FIG. 5 is an elevational view of a replaceable filter sock as used in the filter element of FIG. 1, the filter sock being shown in a flat condition prior to assembly to the support sock.

As shown in FIGS. 2 and 4, the support sock 41 has an end portion 52 disposed below the arcuate operative end 42. This portion 52 is preferably about one to three inches long and provides a convenient handhold for pulling the support tube off of a filter sock 44 which has been filled with the entrained solids. Referring to FIG. 5 it may be seen that the filter sock 44 is a fabric tube across the lower end of which is sewn a straight sealing stitch 54.

In order to assemble a filter element 39 and mount it to the tube sheet 22, there is provided in accordance with another feature of the invention a mounting fixture 56 comprising an elongated rigid tube 58 fixedly mounted over the body portion of a tubular end knob 60 against an annular shoulder 62 on the knob. The tube 58 is substantially shorter than the filter element 44 but only slightly shorter than the desired operating length of the assembled filter element 39.

Figure 6:
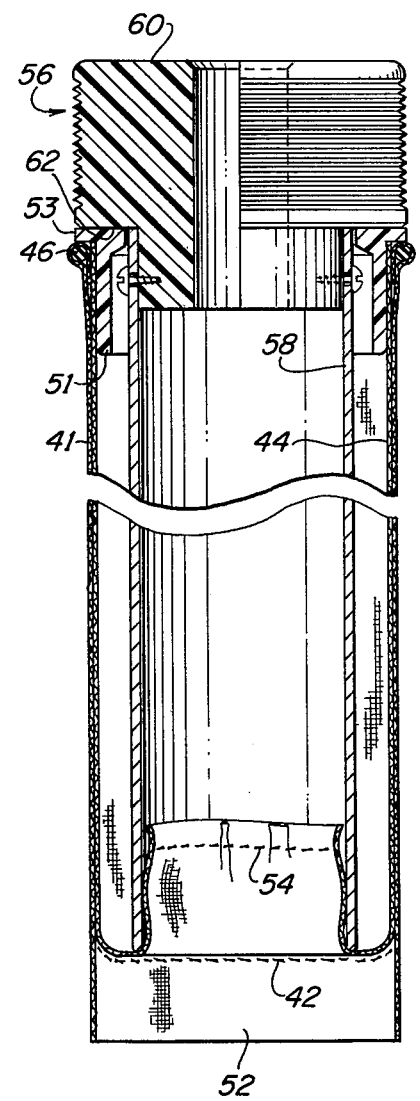
FIG. 6 is a longitudinally sectioned view of the filter and support socks of FIGS. 4 and 5 mounted on an assembly fixture prior to assembly to the tube sheet.

When a filter element is to be assembled in the filter, the retainer 50 is slid up over the tue 58 into engagement with the shoulder 62. A tubular filter sock 44 is then slid up over the tube 58 until its open end abuts the lower face of the flange 53. The closed lower end of the sock 44 is then tucked up into the lower end of the tube 58 as shown in FIG. 6. The upper end of a support sock 41 including the ring 56 is then slid up over the filter sock 44 into abutting relationship with the lower face of the flange 53 as shown in FIG. 6. Using the knob 70 as a handle the assembled filter element is then inserted downwardly through a hole 48 in the tube sheet 22 until the portion of the sock 41 underlying the ring 46 abuts the top surface of the tube sheet surrounding the hole 48. The fixture 56 is then withdrawn while holding the filter element in place.

The support sock 41 is sealably closed near its bottom end along the curved, generally arcuate line 42 in a conventional sewing machine operation. The line 42 is generally arcuate so that under pressure the sock 41 expands into a substantially cylindrical shape. If the line 42 were straight, the sides of the sock would flare out at the lower end. It will be apparent that any outward flaring of the support sock would permit the replaceable filter sock 44 to do likewise wherefor removal of a spent filter sock would be difficult if not impossible.

The filter sock 44 may be formed from conventional, non-woven paper-like fabric filter material glued along a longitudinal stripe 65 to form a tube and then laid flat and sewn along the line 54. The support member 41 is formed of a tubular woven fabric material which is preferably synthetic and seamless. It is laid flat and sewn along the curved line 42. The materials of which the filter sock 44 and the support sock 41 are formed must be mutually compatible in that the filter sock must expand during use so as to remain in intimate contact with the inner surface of the support sock as the latter expands under the operating temperature and pressure. Otherwise, the inner sock will tear under the substantial pressures normally encountered in such filters.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A filter element for use in a filter of the type having a tube sheet separating a filter tank into two compartments, said sheet having a number of holes for receiving a like number of tubular filter elements, said filter element comprising a cylindrical, woven textile support sock open at one end and closed at the other end, a cylindrical, flexible, perforate filter sock open at one end and closed at the other end, said filter sock being fitted within said support sock with said open ends in proximity to one another, means for providing a sealed interlock between said socks and said tube sheet with said socks partially positioned within one of said holes, and the length of said filter sock between said interlock and its closed end being substantially greater than the length of said support sock between said interlock and its closed end.

2. A filter element according to claim 1 wherein said filter sock is stretchable under operating conditions by an amount at least as great as said support sock.

3. A filter element according to claim 2 wherein the portion of said filter sock adjacent its closed end is tucked back up into said filter sock.

4. A filter element according to claim 2 wherein said support sock is closed at its closed end along an arcuate line which bows outwardly away from the open end of said support sock.

5. A filter element according to claim 4 wherein said arcuate line is spaced a substantial distance from the adjacent end of said support sock to provide a handhold at the closed end of said support sock.

6. A filter element according to claim 1 wherein said means for providing a sealed interlock comprises a tubular member extending into the open end of said filter sock, said tubular member having an external annular flange whose external diameter is greater than the diameter of said one of said holes.

7. A filter element according to claim 6 wherein said tubular member has a tubular body portion having a serrated outer surface.

8. In a filter of the type having a tube sheet separating a filter tank into a plurality of compartments and having a circular hole through said sheet, the combination comprising
- a filter element according to claim 1,
- an annular member having an outer diameter exceeding the inner diameter of said hole,
- said support sock extending through said annular member and being folded back on itself,
- the closed end of said support sock being disposed in one of said compartments and said annular member being disposed in the other of said compartments, and
- a tubular retainer member having a tubular body portion fitted within the open end of said filter sock and an external annular flange overlying sid annular member and a portion of said support sock,
- whereby a positive pressure differential between said other compartment and said one compartment places said support sock under tension.

9. A method of filtering comprising the steps of
- providing a filter element having a cylindrical, woven textile support sock open at one end and closed at the other end, a cylindrical, flexible, perforate filter sock open at one end and closed at the other end, said filter sock being fitted within said support sock with said open ends in proximity to one another, means for providing a sealed interlock between said socks and said tube sheet with said socks partially positioned within one of said holes, and the length of said filter sock between said interlock and its closed end being substantially greater than the length of said support sock between said interlock and its closed end;
- mounting said filter element in a hole in a tube sheet separating a filter tank into a first compartment in which the closed end of said filter element is located and a second compartment onto which the open end of said filter element opens, and
- supplying a liquid to be filtered to said second compartment at a pressure exceeding the pressure in said first compartment.

10. A method according to claim 9 where
- said closed end of said filter sock is tucked into the adjacent portion of said filter sock and
- said filter sock is then inserted into said support sock.

11. A method according to claim 10 wherein said filter element is assembled prior to insertion through the hole in said tube sheet by
- inserting a rigid tube into said filter sock, then
- inserting said rigid tube and said overlying filter sock into said support sock, then
- inserting said rigid tube with said filter and support socks thereon through said hole, and then
- withdrawing said rigid tube from said socks while holding said filter and support socks in said tube sheet.

* * * * *